US008639792B2

(12) United States Patent
Tamura

(10) Patent No.: US 8,639,792 B2
(45) Date of Patent: Jan. 28, 2014

(54) JOB PROCESSING SYSTEM, METHOD AND PROGRAM

(75) Inventor: Mineyuki Tamura, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 477 days.

(21) Appl. No.: 12/858,738

(22) Filed: Aug. 18, 2010

(65) Prior Publication Data

US 2011/0078297 A1     Mar. 31, 2011

(30) Foreign Application Priority Data

Sep. 30, 2009 (JP) ................................ 2009-227217

(51) Int. Cl.
*G06F 15/173* (2006.01)
*H04L 29/08* (2006.01)

(52) U.S. Cl.
CPC ..... *H04L 29/08072* (2013.01); *Y10S 707/9994* (2013.01)
USPC ........... 709/223; 709/201; 709/202; 709/203; 709/217; 709/218; 709/219; 709/224; 709/225; 709/226; 707/607; 707/999.01; 725/86; 725/87; 725/91; 725/92; 725/93; 725/94; 725/97; 725/101; 725/103; 725/104; 725/105; 725/114; 725/115; 725/116; 725/117; 358/1.15

(58) Field of Classification Search
USPC ......... 709/201, 202, 203, 217, 218, 219, 223, 709/224, 225, 226; 358/1.15; 707/607, 10, 707/999.01; 725/86, 87, 91, 92, 93, 94, 97, 725/101, 103, 104, 105, 114, 115, 116, 117
See application file for complete search history.

(56) References Cited

U.S. PATENT DOCUMENTS

| 8,231,471 | B2 * | 7/2012 | Blackburn et al. ............... 463/42 |
| 8,533,718 | B2 * | 9/2013 | Yamaguchi .................... 718/101 |
| 2002/0052952 | A1 * | 5/2002 | Yoshida et al. ................ 709/225 |
| 2003/0105809 | A1 * | 6/2003 | Yoshii et al. ................... 709/203 |
| 2003/0204856 | A1 * | 10/2003 | Buxton ......................... 725/120 |
| 2003/0229666 | A1 * | 12/2003 | Hasegawa ...................... 709/203 |
| 2004/0107240 | A1 * | 6/2004 | Zabarski et al. ............... 709/201 |
| 2005/0060701 | A1 * | 3/2005 | Murase ......................... 717/178 |
| 2005/0088684 | A1 * | 4/2005 | Naito et al. .................... 358/1.15 |
| 2006/0004909 | A1 * | 1/2006 | Takuwa et al. ................. 709/203 |
| 2007/0024898 | A1 * | 2/2007 | Uemura et al. ............... 358/1.15 |
| 2007/0033192 | A1 * | 2/2007 | Sakoh et al. .................... 707/10 |
| 2007/0067370 | A1 * | 3/2007 | Honda et al. .................. 707/205 |

(Continued)

FOREIGN PATENT DOCUMENTS

| JP | 2000-242614 | 9/2000 |
| JP | 2001-160038 | 6/2001 |

*Primary Examiner* — Saket K Daftuar
(74) *Attorney, Agent, or Firm* — Brundidge & Stanger, P.C.

(57) ABSTRACT

A job processing system has first to third servers. The first server has a job generation program for generating jobs as requested. The second server has a storage device for storing attribute information on and a file for use in processing each job generated by the first server, a management table for managing job management information on each job by assigning a unique ID to each job, and a queue control program for registering job management information in the management table, referring to the management table, and registering the file for and attribute information on each job in the storage device. The third server has one or more job processing programs for processing jobs acquired from the second server, batch control program for acquiring jobs from the second server and issuing responses concerning the processed jobs, and a storage device for storing attribute information on and a file for each job acquired.

6 Claims, 3 Drawing Sheets

(56) References Cited

U.S. PATENT DOCUMENTS

| | | |
|---|---|---|
| 2007/0198708 A1* | 8/2007 | Moriwaki et al. ............ 709/224 |
| 2007/0276838 A1* | 11/2007 | Abushanab et al. ............ 707/10 |
| 2008/0005176 A1* | 1/2008 | Shimizu .................... 707/104.1 |
| 2008/0147821 A1* | 6/2008 | Dietrich et al. ............... 709/216 |
| 2008/0301119 A1* | 12/2008 | Selvaganesan et al. ........... 707/5 |
| 2009/0080022 A1* | 3/2009 | Tsutsumi .................... 358/1.15 |
| 2009/0174906 A1* | 7/2009 | Leiman et al. ............... 358/1.15 |
| 2009/0180142 A1* | 7/2009 | Suzuki et al. ................ 358/1.15 |
| 2009/0240656 A1* | 9/2009 | Tanabe et al. .................... 707/3 |
| 2009/0254917 A1* | 10/2009 | Ohtani .......................... 718/104 |
| 2009/0296995 A1* | 12/2009 | Shibuya ........................ 382/115 |
| 2009/0323653 A1* | 12/2009 | Noda et al. .................... 370/338 |
| 2010/0302579 A1* | 12/2010 | Nuggehalli et al. ......... 358/1.15 |

* cited by examiner

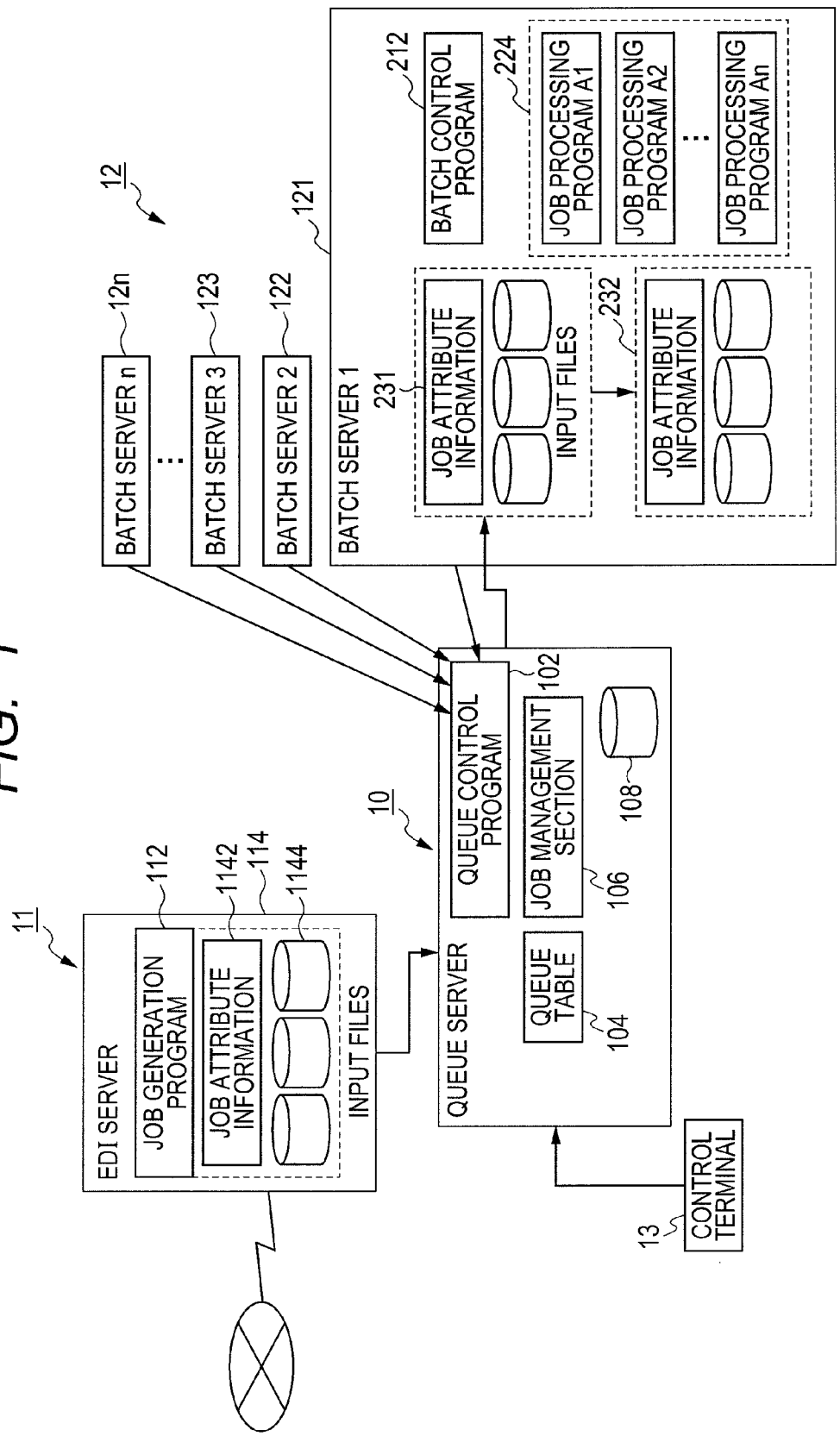

FIG. 2

| JOB ID | JOB NAME | JOB CLASS | PRIORITY WITHIN JOB CLASS | JOB REGISTERED SERVER ID | JOB EXECUTION SERVER ID | PROGRAM INFORMATION | STATUS |
|---|---|---|---|---|---|---|---|
| 0001 | ORDER SHEET GENERATION 1 | A | 1 | SU0121 | SU0121 | X001A1 | BEING EXECUTED |
| 0002 | INVOICE GENERATION 1 | B | 1 | SU0123 | – | Y002B1 | WAITING |
| 0003 | ORDER SHEET GENERATION 2 | A | 2 | – | – | X001A2 | WAITING |
| 0004 | ORDERING COST MANAGEMENT 1 | A | 3 | SU0*** | SU0*** | X001A3 | BEING EXECUTED |
| 0005 | INVENTORY DISPOSAL 1 | C | 1 | SU0*** | SU0*** | Z001A2 | BEING EXECUTED |

FIG. 3

JOB ATTRIBUTE INFORMATION

| JOB ID | 0001 |
|---|---|
| JOB NAME | ***** |
| JOB CLASS | A1 |
| PRIORITY WITHIN JOB CLASS | 1 |
| PROGRAM INFORMATION | X001A1 |

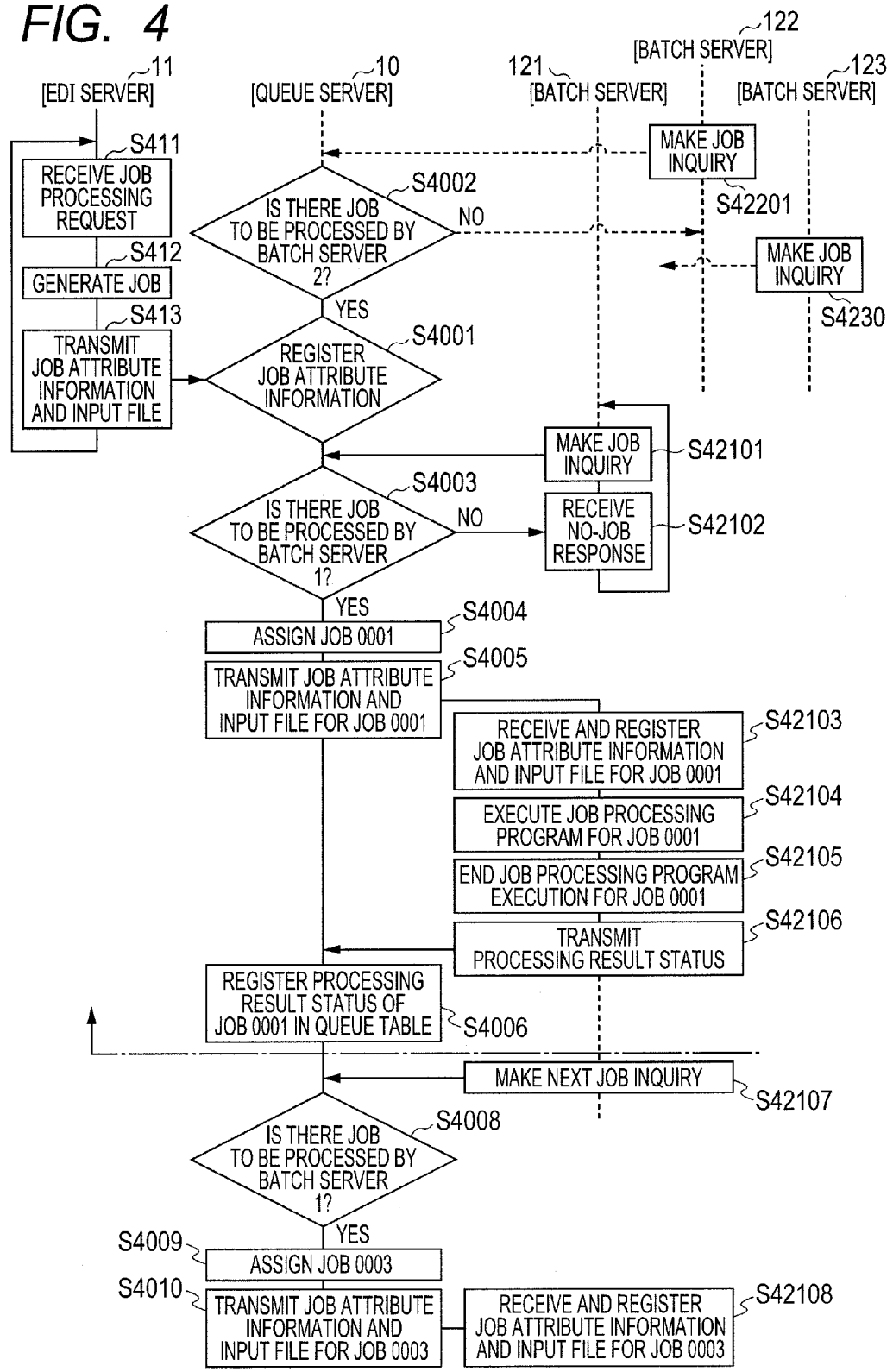

JOB PROCESSING SYSTEM, METHOD AND PROGRAM

CLAIM OF PRIORITY

The present application claims priority from Japanese application JP 2009-227217 filed on Sep. 30, 2009, the content of which is hereby incorporated by reference into this application.

FIELD OF THE INVENTION

The present invention relates to a job processing system, method and program and, more particularly, to management of job processing in which job processing is distributedly performed using plural servers.

BACKGROUND OF THE INVENTION

Distributed job processing performed using plural servers aims at processing load distribution and processing efficiency improvement. JP-A No. 2001-160038, for example, discloses a load distributed information processing system. In the system: a job request received from a client computer is temporarily stored in a job storage device; a job arrival notice is sent to plural server computers simultaneously; when the job arrival notice is received, each of the plural server computers calculates a waiting time corresponding to the magnitude of the current load on the server computer and accesses, after staying in a waiting state for the calculated waiting time, the storage device; and the first server computer to access the job storage device acquires and processes the job. In this way, the load of information processing can be evenly distributed among the plural computers.

JP-A No. 2000-242614 discloses a distributed processing system. In the distributed processing system, a large-scale job is divided into plural small jobs and, of the plural small jobs, those yet to be processed are distributed to terminals from which job acquisition requests have been received for distributed processing among such terminals. This allows the computation load for executing a large-scale job to be divided among plural terminals.

The technique proposed in JP-A No. 2001-160038 allows the load for executing a large-scale job to be divided among plural computers, but the job storage device is required to manage all server computers to which a job arrival notice is to be sent. Also, each of the server computers is required to calculate a waiting time corresponding to the current load on it and stay waiting for the calculated waiting time.

According to the technique proposed in JP-A No. 2000-242614, divided jobs are distributed only when requested from plural terminals, so that jobs are processed under the initiative of terminals. In JP-A No. 2000-242614, however, no proposal is made as to how to manage job processing performed at plural terminals or how to realize job distribution taking job attributes into consideration.

Both JP-A No. 2001-160038 and JP-A No. 2000-242614 appear to assume that the plural computers or terminals to process jobs have uniform processing capacity, and how to manage, when jobs are unevenly distributed among plural computers or terminals, the jobs is not described in either of JP-A No. 2001-160038 and JP-A No. 2000-242614.

SUMMARY OF THE INVENTION

An object of the present invention is to provide a job processing system, method and program which allow jobs to be processed under the initiative of plural servers and in which, even when job processing is not evenly distributed among the plural servers, job processing can be smoothly carried out.

A job processing system according to the present invention is preferably a job processing system for processing jobs using plural servers, including: a first server having a first program control unit that generates jobs when requested; a second server that manages the jobs generated by the first server, the second server having a storage device that stores attribute information on the jobs and files for use in processing the jobs, a management table that manages management information for the jobs by assigning a unique ID to each of the jobs, and a second program control unit that registers job management information in the management table, refers to the job management information registered in the management table, and registers the files for and attribute information on the jobs in the storage device; and plural third servers that successively acquire and process jobs managed by the second server, the third servers each having one or more job processing programs that process jobs acquired from the second server, a third program control unit that acquires jobs from the second server and issuing responses concerning the processed jobs, and a storage device that stores attribute information on and files for the acquired jobs. In the job processing system: the plural third servers successively make inquiries about job processing to the second server; every time an inquiry is received from any of the third servers, the second server refers to the management table and determines whether there is a job which can be processed by the inquiring third server and, when there is such a job, transmits attribute information on and a file for the job to the inquiring third server; after acquiring the attribute information on and file for the job from the second server, the third server executes a corresponding one of the job processing programs and processes the job by referring to the attribute information and the file, and the third program control unit transmits the file and the attribute information reflecting a result of processing the job to the second server; and the second program control unit of the second server stores the attribute information and the file acquired from the third server in the storage device and updates the management table.

According to a preferred embodiment of the present invention, in the job processing system: the plural third servers have the job processing programs for processing plural different types of jobs and are divided into plural classes corresponding to plural job types; the attribute information on each of the jobs includes information on a class specified for each of the jobs and information on job processing priority within the specified class; the management table holds information on the class specified for each of the jobs and information on the job processing priority within the specified class; and the second program control unit refers to the management table and, when there are jobs which can be processed by the inquiring third server for processing jobs of one class within which job processing priority is specified, assigns such jobs to the inquiring third server complying with the job processing priority.

According to a preferred embodiment of the present invention, in the job processing system, the management table holds information including job IDs, job classes for job classification, priority within each of the job classes, program information for use in processing the jobs, and a status of each job assigned to the third servers.

A job processing method according to the present invention is preferably a job processing system for processing jobs using plural servers, comprising the steps of: generating in a first server jobs according to requests received via a network; storing in a second server attribute information on each of the jobs generated by the first server and a file for use in processing each of the jobs in a storage device and managing management information on each of the jobs by assigning a unique ID in a management table; making inquiries about job processing to the second server in a plurality of third servers for processing jobs; referring to the management table every time an inquiry is received from any of the third servers and determining whether there is a job which can be processed by the inquiring third server and transmitting attribute information on and a file for the job to the inquiring third server when there is such a job according to the determination; executing in the third server a corresponding one of the job processing programs after acquiring the attribute information on and file for the job from the second server and processing the job by referring to the attribute information and the file and transmitting the file and the attribute information reflecting a result of processing the job to the second server; and storing in the second server the attribute information and the file acquired from the third server in the storage device and updating the management table.

Programs used in a job processing system according to the present invention are preferably a collection of programs for managing job processing performed by plural servers, including: a first program that, in a first server, generates jobs according to requests for processing received via a network; a second program that, in a second server, stores attribute information on each of the jobs generated by the first server and a file for use in processing each of the jobs in a storage device and manages management information on each of the jobs by assigning a unique ID in a management table, which, every time an inquiry is received from any of the third servers, refers to the management table and determines whether there is a job processable by the inquiring third server and, when there is such a job, transmits attribute information on and a file for the job to the inquiring third server, and that stores the attribute information and the file acquired from the third server in the storage device and updates the management table; and a third program that, in each of plural third servers for processing the jobs, makes inquiries about job processing to the second server, stores and manages the attribute information on and the file for each job acquired from the second server, updates, after executing the corresponding job processing program, the attribute information on and the file for each job, and transmits the attribute information and the file reflecting the result of processing each job to the second server.

According to the present invention, plural computers can, at their initiative, acquire and process jobs and, even when jobs are not evenly distributed among the plural computers, job processing can be carried out smoothly.

Also, according to the present invention, plural batch servers can undertake processing of jobs of ranks corresponding to them, respectively, so that the processing capacity of an entire job processing system can be increased.

Furthermore, according to the present invention, plural batch servers can be assigned to process jobs of a same rank. Therefore, even when one of the plural batch servers goes out of order, the remaining ones of the plural batch servers can process jobs of the same rank, so that the job processing system as a whole is prevented from stopping job processing. In such a cases, among the remaining ones of the plural batch servers, every time a batch server finishes processing a job, it acquires another job of the same rank from a queue server, then processes the job, so that the job processing capacity of the job processing system is prevented from greatly decreasing.

In the case of an existing centralized job processing system, it is necessary to make the processing capacity of plural servers uniform or otherwise appropriately manage the processing capacity of plural servers. According to the present embodiment, plural batch servers differing in processing capacity can be used.

BRIEF DESCRIPTION OF THE DRAWINGS

FIG. 1 shows an overall structure of a job processing system according to an embodiment of the present invention;

FIG. 2 shows a queue table structure according to the embodiment;

FIG. 3 shows example job attributes according to the embodiment; and

FIG. 4 shows an example flowchart of job processing according to the embodiment.

DESCRIPTION OF THE PREFERRED EMBODIMENT

FIG. 1 shows an overall structure of a job processing system. The job processing system is connected to a network, for example, a public line network or an exclusive line network and includes an electronic data interchange (EDI) server 11 having a job generation function, a queue server 10 for collectively storing and managing plural jobs generated, plural batch servers 121 to 12n (collectively referred to as "batch servers 12") for successively acquiring jobs from the queue server 10 and processing them, and a control terminal 13 for monitoring the status of job processing performed by the batch servers 12 and changing, when required, settings of the batch servers 12.

The EDI server 11 is a computer for inter-corporate information exchanges carried out via a network. For example, order acceptance/placement data, quotation data, data on or requests for processing regarding settlement or shipping/arrival of goods, and responses to such requests can be exchanged in a predetermined format using the EDI server 11. The EDI server 11 has hardware including a processor, memory, and a storage device and software including a job generation program 112. The EDI server 11 analyzes data and requests for processing received via a network and generates jobs 114 by having the job generation program 112 executed by the processor. The jobs 114 generated are successively transferred to the queue server 10.

Even though, in the present example, the EDI server 11 is assumed to be a computer having a job generation function, it may be replaced by a different type of server having a job generation function, for example, a web server. Or, an arrangement may be made such that jobs generated by both an EDI server and a web server are processed in a system.

The jobs 114 each include job attribute information 1142 and an input file 1144 used for job processing. The job attribute information 1142 on each job includes, as shown in FIG. 3, a job ID for job identification, a job name, a job class, priority within job class, and program information required for job processing. A job class represents a type or rank of jobs processed by the batch servers 12. For example, job class A may be defined as processing for order sheet generation and job class B may be defined as processing for invoice generation. A priority within job class represents, in cases plural jobs of the same job class are to be processed according to priority, the priority assigned to a specific job.

The queue server 10 has hardware including a processor, a memory, and a storage device and software including a queue control program 102, a queue table 104, and a database (DB)

108. The queue control program 102 assumes a central function of the queue server 10. By executing the function, the queue control program 102 realizes the function of a job management section 106 for registering jobs and managing the status of processing of each job. The queue table 104 manages the jobs acquired by the queue server 10 and the progress of processing of the jobs. An example structure of the queue table 104 will be described later with reference to FIG. 2. The DB 108 stores the input files 1144 for jobs acquired from the EDI server 11. The input files 1144 are stored in folders each prepared for a job ID for association with the corresponding job.

Each of the batch servers 12 is a job processing computer having hardware including a processor, a memory and a storage device and software including a batch control program 212, one or more job processing programs 224, jobs (job attribute information on and input files for jobs before being processed) 231 acquired from the queue server 10, and post-processing jobs (job attribute information on and input files for jobs after being processed) 232. The job attribute information on and input files for jobs after being processed are returned to the queue server 10 under the control of the batch control program 212. The batch control program 212 acquires, collaborating with the queue control program 102 in the queue server 10, jobs from the queue server 10 and manages the progress of job processing in the corresponding batch server 12 and responses to be sent to the queue server 10 regarding processed jobs.

The plural job processing programs 224 are for processing the jobs acquired by the corresponding batch server 12. Individual batch servers 121 to 12n each have plural job processing programs prepared beforehand. It is regarded efficient to allocate the batch servers 121 to 12n to specialized processing, respectively. It may, therefore, be advisable to classify the batch servers 121 to 12n by type of processing to be performed and provide them with specialized processing programs for executing the respective types of processing according to the classification. For example, the batch server 121 may hold programs A1 to An to process such jobs as order sheet generation and ordering cost management, the batch server 122 may hold programs B1 to Bm to process such jobs as invoice generation and invoicing cost management, and the batch server 123 may hold programs C1 to Ck to process such jobs as inventory management. In cases where many requests for processing jobs of the same class occur, some of the plural batch servers may hold the same programs corresponding to the same class, so that such batch servers may process plural jobs of the same class concurrently. The plural batch servers 12 may each be either an independent hardware computer or a virtual software computer. The control terminal 13 is, for example, a personal computer (PC) having an input unit and a display unit.

FIG. 2 shows a queue table structure according to an embodiment of the present invention. The queue table 104 is for managing jobs and the progress of job processing. The queue table 104 holds information extracted from the job attribute information 1142 received from the EDI server 11. The information includes job IDs, job names, job classes, priority within each job class, IDs of batch servers in which jobs are registered, IDs of batch servers having executed jobs, program information, and the status of each job to be processed or already processed in the batch servers 12 (for example, being executed, normally ended, waiting, or abnormally ended). The server IDs are held as job execution log data and are not directly involved with job control. The server IDs may be omitted when such log data is not required.

With reference to FIG. 4, job processing performed in the job processing system will be described. The following description is based on the assumption that, in the job processing system, the batch servers 121 and 122 are to process jobs of class A and that the batch servers 123 and 12n are to process jobs of class B and jobs of class C, respectively. Therefore, of the jobs, information on which is held in the queue table 104, those of job class A (A1, A2, and A3) can be processed by the batch server 121 or 122. Likewise, the jobs of job classes B and C can be executed by the batch servers 123 and 12n, respectively. The jobs of job class A are processed according to the job priority within job class. Namely, the job of job class A2 is processed after processing of the job of job class A1 is finished, and the job of job class A3 is processed after processing of the job of job class A2 is finished.

Every time a job processing request is received (S411) via a network, the EDI server 11 generates a job (i.e. job attribute information allocated a job ID and an input file) (S412) by executing the job generation program 112 and transmits the generated job (the job attribute information and input file) to the queue server 10 (S413). The EDI server 11 repeats this processing (S411 to S413).

Every time a job transmitted from the EDI server 11 is received, the queue server 10 activates the job management section 106 by executing the queue control program 102 and registers the job. Namely, the queue server 10 stores the job attribute information and the corresponding input file received from the EDI server 11 in the DB 108 and registers the management information for the job in the queue table 104. An example state of the queue table 104 holding registered information is shown in FIG. 2. Immediately after job management information for a job is registered in the queue table 104, the job has not yet been acquired by any of the batch servers, so that the status column of the queue table 104 indicates "Waiting" for the job. Even though, the flowchart of FIG. 4 includes only one step (S4001) for registering a job in the queue server 10, job registration is made every time a job is received, so that the step (S4001) may be regarded as performable anywhere in the routine.

The plural batch servers 12 successively make inquiries to the queue server 10 about whether there are jobs to be processed by them (S42101, S42201, and S42301). Every time such an inquiry is received from any of the batch servers 12, the queue server 10 determines, by referring to the queue table 104 under the control of the queue control program 102, whether there is a job to be processed by the inquiring batch server (S4002 or S4003). When it is determined that there is no job to be processed by the inquiring batch server, the queue server 10 gives a response to that effect to the inquiring batch server. After such a no-job response is received (S42102) from the queue server 10, the batch server repeats making a job inquiry.

The processing routine to follow when it is determined that there is a job to be processed by the batch server 121 (S4003) will be described below. The same routine is followed in the case of other batch servers, too. When the queue server 10 finds a job (job ID 0001) to be processed by the batch server 121 by referring to the queue table 104, the queue server 10 allocates the job to the batch server 121 (S4004) and transmits the job (job attribute information and an input file) of job ID 0001 to the batch server 121 (S4005).

When the job attribute information and input file 231 transmitted from the queue server 10 is received, the batch server 121 registers the job attribute information and input file 231 in a storage device (S42103) under the control of the batch control program 212. Subsequently, the batch server 121 processes the registered job (S42104) by executing the job processing program (for example, job processing program X001A1) specified by the program information included in the job attribute information on the job ID 0001. Every time a batch server registers a job or executes a registered job, a response including a job registered server ID or an execution server ID is sent from the batch server to the queue server 10 and the job registered server ID or execution server ID is registered in the queue table 104. When processing of a job is ended (S42105), a processing result status information (representing a normal end or an abnormal end) is transmitted to the queue server 10 (S42106).

In the queue server 10, when the job attribute information is received, the data on the job (job ID 0001) included in the queue table 104 is updated according to the received job attribute information under the control of the queue control program 102. Namely, the processing result status of the job ID 0001 is entered in the status column of the job ID 0001 (S4006).

Also, when it is determined by the processing program (for example, job processing program X001A1) executed in the batch server 121 that subsequent processing is required, a request for job generation is given to the batch control program 212. The batch control program 212 then generates one or more subsequent jobs (job attribute information and input files for subsequent jobs generated by the job processing program). The subsequent jobs thus generated are transmitted to the queue server 10 as in the case of job transmission from the EDI server 11.

The processing of a job acquired by the batch server 121 by making a job inquiry to the queue server 10 is completed as described above. Subsequently, the batch server 121 makes another job inquiry to the queue server 10 (S42107), acquires another job from the queue server 10, and proceeds similarly as described above (S4008 to S42108).

The priority within each job class will be described below with reference to FIG. 2 showing an example queue table. Of job IDs 0001, 0003, and 0004 of job class A, job IDs 0003 and 0004 are assigned priorities 2 and 3, respectively, whereas job ID 0001 is assigned priority 1. Hence, job IDs 0003 and 0004 can be processed only after the result of processing job ID 0001 with a higher priority is obtained. Namely, only after normal ending of job ID 0001 is confirmed (a "normal end" indication is entered in the corresponding status column of the queue table), jobs with job IDs 0003 and 0004 are allocated to the inquiring batch server. Until processing of job ID 0001 is normally ended, a "waiting" indication is held in the status column for each of job IDs 0003 and 0004.

While the batch server 121 is engaged in processing jobs of job class A (S42101 to S42106), other batch servers can successively make job inquiries to the queue server 10 to acquire and process jobs of other job classes having nothing to do with the job priority within job class A, for example, jobs of job classes B and C, corresponding to them, respectively.

The present embodiment also generates the following operational effects. The administrator can easily check, using the control terminal 13, the progress of job execution and the contents of input files. As information on the progress of job execution, for example, the contents of the queue table as shown in FIG. 2 are displayed on a display unit. It is also possible, using the control terminal 13, to change parameters of a batch server, for example, to set or change the execution class or the execution class priority of the batch server set in the queue table. This can be done, from the control terminal 13, by changing settings (for example, a setting specifying an execution class allocated to the batch server) for the batch control program of the batch server. It is, therefore, possible to make an arrangement, for example, to have a special type of jobs executed by a specified batch server. Making such an arrangement may be effective particularly when job processing is congested.

Also, the status of a job indicated in the queue table can be changed, for example, from "ended" to "waiting" using the control terminal 13. This makes it easy to have an ended job executed again.

An embodiment of the present invention has been described, but the present invention is not limited to the above embodiment. It can be used in various modified ways. For example, even though, in the above embodiment, the queue server and the plural batch servers are separated, a modified arrangement may be used in which the batch server 121 is provided with the function of the queue server 10 while the other batch servers 122 to 12n are provided with normal batch server functions. When, in such a modified arrangement, the batch server 121 is also provided with a job processing program and a batch control program, the batch server 121 will be enabled to carry out job processing of a certain rank while executing the function of the queue server 10.

What is claimed is:

1. A job processing system for processing jobs using a plurality of servers, comprising:
 a first server having a first program control unit that generates jobs when requested;
 a second server that manages the jobs generated by the first server, the second server having a storage device that stores attribute information on the jobs and files for use in processing the jobs, a management table that manages management information for the jobs by assigning a unique ID to each of the jobs, and a second program control unit that registers job management information in the management table, refers to the job management information registered in the management table, and registers the files for and attribute information on the jobs in the storage device; and
 a plurality of third servers that successively acquire and process jobs managed by the second server, the third servers each having one or more job processing programs that process the jobs acquired from the second server, a third program control unit that acquires jobs from the second server and issues responses concerning the processed jobs, and a storage device that stores attribute information on and files for the acquired jobs;
 wherein the plurality of third servers successively make inquiries about job processing to the second server;
 wherein, every time an inquiry is received from any of the third servers, the second server refers to the management table and determines whether there is a job which can be processed by the inquiring third server and, when there is such a job, transmits attribute information on and a file for the job to the inquiring third server;
 wherein, after acquiring the attribute information on and file for the job from the second server, the third server executes a corresponding one of the job processing programs and processes the job by referring to the attribute information and the file, and the third program control unit transmits the file and the attribute information reflecting a result of processing the job to the second server;
 wherein the second program control unit of the second server stores the attribute information and the file acquired from the third server in the storage device and updates the management table according to the received attribute information, wherein the plurality of third servers have the job processing programs for processing a plurality of different types of jobs and are divided into a plurality of classes corresponding to a plurality of job types;

wherein the attribute information on each of the jobs includes information on a class specified for each of the jobs and information on job processing priority within the specified class;

wherein the management table holds information on the class specified for each of the jobs, information on the job processing priority within the specified class and information on identification of the third server for executing the job registered; and wherein the second program control unit refers to the management table and, when there are jobs which can be processed by the inquiring third server for processing jobs of one class within which job processing priority is specified, assigns such jobs to the inquiring third server complying with the job processing priority.

2. The job processing system according to claim 1, wherein the management table holds information including job IDs, job classes for job classification, priority within each of the job classes, program information for use in processing the jobs, and a status of each job assigned to the third servers.

3. The job processing system according to claim 1, wherein the attribute information includes job IDs for job identification, job names, job classes, priority within each of the job classes, and program information for use in processing the jobs.

4. A job processing method for processing jobs using a plurality of servers, comprising the steps of:

generating in a first server jobs according to requests received via a network;

storing in a second server attribute information on each of the jobs generated by the first server and a file for use in processing each of the jobs in a storage device and managing management information on each of the jobs by assigning a unique ID in a management table;

making inquiries about job processing to the second server in a plurality of third servers for processing jobs;

referring to the management table every time an inquiry is received from any of the third servers and determining whether there is a job which can be processed by the inquiring third server and transmitting attribute information on and a file for the job to the inquiring third server when there is such a job according to the determination;

executing in the third server a corresponding one of the job processing programs after acquiring the attribute information on and file for the job from the second server and processing the job by referring to the attribute information and the file and transmitting the file and the attribute information reflecting a result of processing the job to the second server; and storing in the second server the attribute information and the file acquired from the third server in the storage device and updating the management table according to the received attribute information;

wherein the plurality of third servers have the job processing programs for processing a plurality of different types of jobs and are divided into a plurality of classes corresponding to a plurality of job types;

wherein the attribute information on each of the jobs includes information on a class specified for each of the jobs and information on job processing priority within the specified class;

wherein the management table holds information on the class specified for each of the jobs, information on the job processing priority within the specified class and information on identification of the third server for executing the job registered; and wherein the second server refers to the management table and, when there are jobs which can be processed by the inquiring third server for processing jobs of one class within which job processing priority is specified, assigns such jobs to the inquiring third server complying with the job processing priority.

5. The job processing method according to claim 4, wherein the management table holds information including job IDs, job classes for job classification, priority within each of the job classes, program information for use in processing the jobs, and a status of each job assigned to the third servers.

6. The job processing method according to claim 4, wherein the attribute information includes job IDs for job identification, job names, job classes, priority within each of the job classes, and program information for use in processing the jobs.

* * * * *